UNITED STATES PATENT OFFICE.

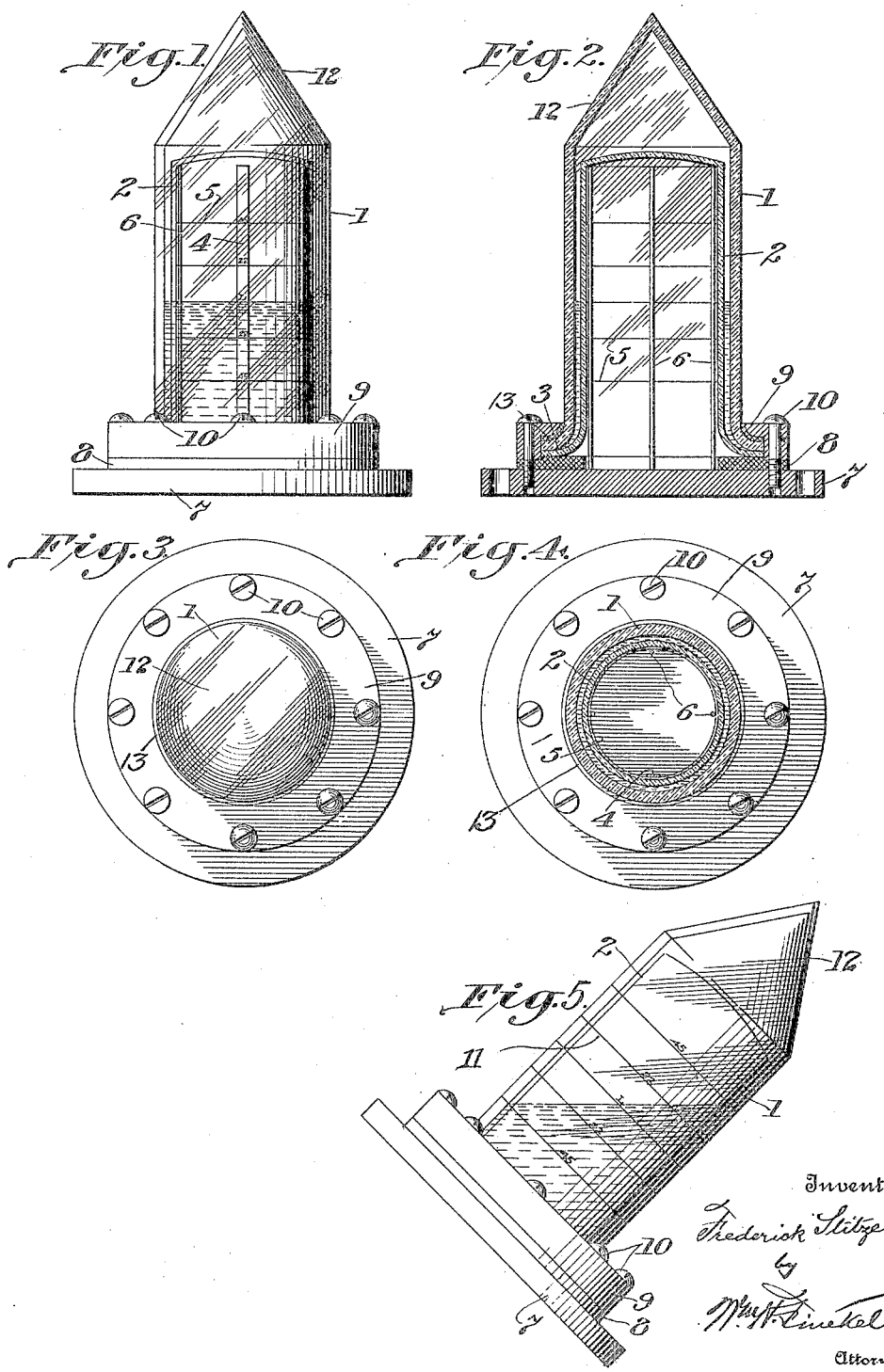

FREDERICK STITZEL, OF LOUISVILLE, KENTUCKY.

INDICATOR.

1,291,230. Specification of Letters Patent. Patented Jan. 14, 1919.

Application filed November 24, 1917. Serial No. 203,697.

*To all whom it may concern:*

Be it known that I, FREDERICK STITZEL, a citizen of the United States, residing at Louisville, in the county of Jefferson and State of Kentucky, have invented a certain new and useful Improvement in Indicators, of which the following is a full, clear, and exact description.

As I am informed and believe there is need of an instrument for accurately informing an aviator when his airplane or other form of flying machine is moving out of a horizontal plane, and such an instrument is of special service when the clouds cut off the aviator's view of the earth, or objects upon the earth's surface, and thus deprive him of comparative bases for reckoning the level of his machine. Such an instrument should be capable of visually disclosing deviation of the machine from the horizontal in any direction, fore and aft and laterally as well, and also should be substantially unaffected by the vibration of the machine and by centrifugal action.

The object of my invention is to provide a simple and efficient instrument to meet the conditions above outlined, and for use generally as a level.

The invention consists of a container adapted to be placed vertically in the flying machine and provided with a fluid or liquid body and a degree scale so combined and arranged that the level or inclination of the machine will be indicated on the scale by the relative movement of the fluid in the container, as I will proceed now to explain and finally claim.

In the accompanying drawings illustrating the invention, in the several figures of which like parts are similarly designated, Figure 1 is an elevation; Fig. 2 is a vertical section; Fig. 3 is a top plan view, and Fig. 4 is a horizontal section, showing one form of the invention. Fig. 5 is an elevation showing another form of the invention and tilted to illustrate the operation.

Referring to that form of the invention illustrated in Figs. 1 to 4, the indicator comprises an outer shell 1, of glass or other transparent material, and an inner shell 2 of similar or other material, and of such smaller diameter than the interior of the shell 1 as to leave a space between the two shells of one-eighth of an inch, more or less. The tops of these shells are closed, while their bottom edges are turned out to form flanges 3, which are hermetically united, as by fusing. An opening having been left in the top of the outer shell, any suitable liquid or fluid, such as alcohol, mercury or the like, is introduced into the space between the two shells to a given height, and then the opening in the outer shell through which the liquid is introduced is hermetically sealed, as by fusing, so that the liquid is contained within an air-tight space within the outer shell, and between it and the inner shell, and free to move in such space.

A degree scale is provided either by means of a separate metallic structure, as shown in Figs. 1 to 4, or by etching, engraving, painting, printing or otherwise producing it directly upon the outer shell, as shown in Fig. 5, so as to be visible to the aviator or pilot. When the scale is of metal or other material and separate from the shell, it may consist of a skeleton frame composed of a strip 4 sufficiently wide to receive the scale numerals, and this is connected by horizontal wires 5 made fast thereto, with a number of rods 6, the wires 5 serving also as scale lines and extending entirely around the instrument so as to be visible to the pilot or aviator from any point of view. The skeleton scale member may be arranged within the inner shell and held in position therein by its lower end resting upon the aftermentioned base or packing ring and its upper end coming into substantial contact with the crown or top of the inner shell. As a substitute for this form of scale, the scale may be applied directly to one of the shells as described in connection with Fig. 5.

The instrument is designed to be secured in a vertical position in or on the flying machine, and one form of attachment may comprise a plate 7 having a packing ring 8 of any suitable material, such as rubber or leather, upon which the flanges 3 rest, and then there is applied to the plate 7 the flanged ring 9, the flange of which overlies the flanges 3 and is held in place by means of screws or other suitable fastenings 10 engaging the plate 7. This construction provides for the erection of the instrument on some subjacent horizontal portion of the flying machine, but it is obvious that the instrument may be secured to other portions of the machine, but in any case, it is essential, or, at least, advisable to have the instrument arranged vertically.

As will be understood, when the flying machine tilts fore or aft or laterally, the fluid in the instrument will follow the direction of inclination and thus indicate on the scale the angle and direction of inclination, so that the avator may know instantly the inclination of his machine by inspection of the indicator.

In the modification illustrated in Fig. 5, the graduated scale 11 is shown as applied directly to the outer shell, the numbered transverse lines on that figure indicating the scale.

The top of the outer shell may be conical, as indicated at 12, or it may be of other form.

In either form of the device, a packing ring 13 (Fig. 2) may be interposed between the flange of the ring 9 and the flange of the shell, to avoid direct metallic contact and to insure a tight joint.

As will be observed, the scale is repeated above and below the liquid level, but while this is a convenience, it is not necessary.

When a colorless liquid is used, or one not readily visible, its visibility may be insured by the addition to it of any suitable coloring matter.

Variations in details of construction are permissible within the principle of the invention and the scope of the subjoined claims.

What I claim is:—

1. An indicator, comprising a transparent outer shell, and an inner shell of less diameter than the outer shell and spaced apart from it, a visible liquid contained in the space between the shells and mobile therein as the indicator changes position, and a graduated scale fixed with relation to the indicator and upon which the angle and direction of inclination may be ascertained by conjunction of the level of the confined liquid with said scale.

2. An indicator, comprising a transparent outer shell and an inner shell of less diameter and spaced apart from the outer shell, a visible liquid contained in the space between the outer and inner shells and adapted to move therein as the indicator is moved into and out of normal position, and a graduated scale fixed with relation to the shells and upon which the angle and direction of inclination of the indicator is indicated by the relative movement of the liquid.

3. An indicator, comprising a transparent outer shell and a transparent inner shell of less diameter and spaced apart from the outer shell, a visible liquid contained in the space between the outer and inner shells and adapted to move therein as the shells are moved out of horizontal position, and a degree scale arranged within the shells stationarily and upon which the degree of inclination of the shells is indicated by the liquid.

4. An indicator, composed of an inner shell and an outer shell of transparent material, closed at top and bottom, the inner shell being spaced apart from the outer shell and said space provided with a visible mobile liquid, a base to which the shells are fixed, and a skeleton indicator arranged within the shells and confined therein against the base.

In testimony whereof I have hereunto set my hand this 22nd day of November, A. D. 1917.

FREDERICK STITZEL.

Witnesses:
 Louise Parks Bell,
 H. J. Krausgill.